(12) United States Patent
Strigel et al.

(10) Patent No.: US 11,804,048 B2
(45) Date of Patent: Oct. 31, 2023

(54) RECOGNIZING THE MOVEMENT INTENTION OF A PEDESTRIAN FROM CAMERA IMAGES

(71) Applicant: Conti Temic microelectronic GmbH, Nuremberg (DE)

(72) Inventors: Elias Strigel, Wangen (DE); Martin Pfitzer, Bodolz (DE); Stefan Heinrich, Achern (DE); Manuel du Bois, Bad Freienwalde (DE); Felix Hachfeld, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 17/248,563

(22) Filed: Jan. 29, 2021

(65) Prior Publication Data

US 2021/0150193 A1 May 20, 2021

Related U.S. Application Data

(63) Continuation of application No. PCT/DE2019/200091, filed on Jul. 30, 2019.

(30) Foreign Application Priority Data

Jul. 30, 2018 (DE) ..................... 10 2018 212 655.0

(51) Int. Cl.
*G06T 7/20* (2017.01)
*G06V 20/58* (2022.01)
(Continued)

(52) U.S. Cl.
CPC .............. *G06V 20/58* (2022.01); *G06F 18/24* (2023.01); *G06V 40/103* (2022.01); *G06V 40/23* (2022.01)

(58) Field of Classification Search
CPC ...... G06V 20/58; G06V 40/103; G06V 40/10; G06V 20/53; G06V 20/56; G06V 20/41;
(Continued)

(56) References Cited

U.S. PATENT DOCUMENTS

| 2011/0184617 A1 | 7/2011 | Hegemann et al. |
| 2012/0013796 A1* | 1/2012 | Sato ...................... H04N 7/014 |
| | | 348/E7.003 |

(Continued)

FOREIGN PATENT DOCUMENTS

| CN | 1973515 A  * | 5/2007 | ............. B25B 27/10 |
| DE | 102014207802 B3 | 10/2015 | |
| WO | 2009141092 A1 | 11/2009 | |

OTHER PUBLICATIONS

Zhijie Fang et al., "On-Board Detection of Pedestrian Intentions", Sensors, vol. 17, p. 2193, Sep. 2017.

(Continued)

*Primary Examiner* — Quan M Hua

(57) ABSTRACT

A method and a driver assistance system recognize the intention of a pedestrian to move on the basis of a sequence of images of a camera. The method includes detecting a pedestrian in at least one camera image. The method also includes selecting a camera image that is current at the time t and selecting a predefined selection pattern of previous camera images of the image sequence. The method further includes extracting the image region in which the pedestrian was detected in the selected camera images of the image sequence. The method also includes classifying the movement profile of the detected pedestrian on the basis of the plurality of extracted image regions. The method outputs the class that describes the movement intention determined from the camera images of the image sequence.

10 Claims, 5 Drawing Sheets

(51) Int. Cl.
*G06V 40/20* (2022.01)
*G06V 40/10* (2022.01)
*G06F 18/24* (2023.01)

(58) Field of Classification Search
CPC ...... G06V 10/50; G06V 10/993; G06V 20/40;
G06V 40/20; G06V 40/25; G06V 10/255;
G06V 20/10; G06V 20/182; G06V 20/52;
G06V 20/588; G06V 40/23; G06V 10/25;
G06V 10/454; G06V 10/46; G06V
10/473; G06V 20/54; G06V 30/194;
G06T 7/00; G06T 2207/10016; G06T
2207/30261; G06T 7/20; G06T
2207/10028; G06T 2207/20081; G06T
7/11; G08G 1/166; G08G 1/16; G08G
1/005
See application file for complete search history.

(56) References Cited

U.S. PATENT DOCUMENTS

| | | | |
|---|---|---|---|
| 2013/0155275 A1* | 6/2013 | Shimizu | H04N 9/735 |
| | | | 348/370 |
| 2015/0310265 A1 | 10/2015 | Suerth et al. | |
| 2017/0268896 A1* | 9/2017 | Bai | G08G 1/0141 |
| 2018/0118106 A1* | 5/2018 | You | G06V 40/103 |
| 2018/0156624 A1* | 6/2018 | Bai | G08G 1/0129 |
| 2019/0176820 A1* | 6/2019 | Pindeus | B60W 30/09 |

OTHER PUBLICATIONS

Omair Ghori et al., "Learning to Forecast Pedestrian Intention from Pose Dynamics", Proc. of the 2018 IEEE Intelligent Vehicles Symposium (IV), Changshu, China, p. 1277-1284, Jun. 26-30, 2018.
Zhe Cao et al., "Realtime Multi-Person 2D Pose Estimation using Part Affinity Fields", Apr. 14, 2017.
Christopher G Keller et al., "Will the Pedestrian Cross? A Study on Pedestrian Path Prediction", IEEE Transaction on Intelligent Transportation Systems, vol. 15, No. 2, p. 494-506, Apr. 2014.
Yu Kong et al., "Human Action Recognition and Prediction: A Survey", Journal of Latex Class Files, vol. 13, No. 9, Sep. 2018.
Min-Joo Kang et al., "Intrusion Detection System Using Deep Neural Network for In-Vehicle Network Security", PLoS One 11(6), Jun. 7, 2016.
R. Quintero et al., "Pedestrian Intention and Pose Prediction through Dynamical Models an Behaviour Classification", Proc. of the 2015 IEEE 18th International Conference on Intelligent Transportation Systems, Las Palmas, Spain, 2015.
Kohler, S. et al., "Stationary Detection of the Pedestrian's Intention at Intersections", IEEE Intelligent Transportation Systems Magazine, vol. 87, 2013.
German Patent Search Report dated Apr. 29, 2019 for the counterpart German Patent Application No. 10 2018 212 655.0.
International Search Report and the Written Opinion of the International Searching Authority dated Oct. 23, 2019 for the counterpart PCT Application No. PCT/DE2019/200091.
C.G. Keller et al. "Will the Pedestrian Cross? Probabilistic Path Prediction based on Learned Motion Features", DAGM 2011, LNCS 6835, pp. 386-395, 2011.

* cited by examiner

RECOGNIZING THE MOVEMENT INTENTION OF A PEDESTRIAN FROM CAMERA IMAGES

CROSS REFERENCE TO RELATED APPLICATION

This application is a continuation of International application No. PCT/DE2019/200091, filed Jul. 30, 2019, which claims priority to German patent application No. 10 2018 212 655.0, Jul. 30, 2018, each of which is hereby incorporated by reference.

TECHNICAL FIELD

The technical field relates to systems and methods to recognize a movement intention of a pedestrian.

BACKGROUND

Current video-based systems recognize and classify pedestrians. The position and speed of the pedestrians can be established over time by way of a tracking algorithm (tracking).

WO 2009/141092 A1 discloses a driver assistance system for preventing a vehicle colliding with pedestrians, which includes a camera sensor and/or a beam sensor such as, e.g., a millimeter wave radar. When an object that moves at an established speed across a pedestrian crossing is detected, the object is detected as being a pedestrian with a probability that is sufficiently high to output a warning to the driver and to avoid a potential collision.

The detection and tracking algorithms currently used in the above reference are not sufficient to recognize whether a pedestrian is intending to cross the road.

In the publication *Will the Pedestrian Cross? Probabilistic Path Prediction based on Learned Motion Features* by C. G. Keller, C. Hermes and D. M. Gavrila, DAGM 2011, LNCS 6835, pp. 386-395, 2011, a process for pedestrian action classification and movement prediction is presented, in which the position of a pedestrian is established by means of a pedestrian detector and movement features are extracted from the optical flow.

DE 10 2014 207 802 B3 discloses a method and a system for proactively recognizing an action of a road user in road traffic. An image of the road user (e.g., a pedestrian), which is structured in a pixel-wise manner, is captured by means of at least one camera, and corresponding image data are generated. Image data of multiple pixels are grouped in each case by cells, wherein the image comprises multiple cells. A respective centroid is established on the basis of the image data within a cell. For each of the pixels, the respective distance from the centroids of a plurality of cells is determined, wherein a property vector that is associated with the pixel is formed on the basis of coordinates of the respective pixel and the centroids. The property vector is compared to at least one reference vector cluster and, based on the comparison, a pose which is representative of the fact that the road user will execute the action is associated with the road user. With this method, it is assumed that, on the basis of poses of a road user, the latter's intention (e.g., intention to cross at the crosswalk) can already be recognized prior to the execution of the actual action. Based on this pose recognition, proactive measures can likewise be taken prior to said action occurring such as, for example, outputting an audible and/or visual warning to the driver and/or to the road user captured by measurement technology and/or effecting a controlling intervention in a vehicle system such as, for example, in the brakes or in the steering.

A pose can, for example, be associated with a skeleton-like, simplified schematic representation of the road user or pedestrian. The pose can in turn be associated with an action which is to be expected of the road user, on the basis of which a traffic situation is assessed, a possible danger is deduced and, if necessary, further control measures can be introduced fully or partially automatically. For example, a partially bent-over pose, in which a person typically begins running, can be associated with a danger in road traffic, if the pose is captured in an orientation "from the front", i.e., the person is moving towards the vehicle.

The disadvantage of this approach is, on the one hand, the formation of the property vectors is an elaborate process and, on the other hand, the actual intention of a pedestrian cannot be established sufficiently reliably from an individual pose.

Further publications regarding recognizing the intention of pedestrians include:

Fang, Z. et al.: On-Board Detection of Pedestrian Intentions, Sensors 2017, Vol. 17, 2193, 14. DOI: 10.3390/s17102193.

Köhler, S. et al.: Stationary Detection of the Pedestrian's Intention at Intersections. IEEE Intelligent Transportation Systems Magazine, Vol. 87, 2013, pp. 87-99. DOI: 10.1109/MITS.2013.2276939.

Quintero, R. et al.: Pedestrian Intention and Pose Prediction through Dynamical Models and Behaviour Classification. Proc. of the 2015 IEEE 18th International Conference on Intelligent Transportation Systems, Las Palmas, Spain, 2015, pp. 83-88. DOI: 10.1109/ITSC.2015.22.

Kong, Y. et al.: Human Action Recognition and Prediction: a Survey. Preprint on Axiv.org, Feb. 7, 2018, available at https://axiv.org/abs/1806.11230.

Ghori, O. et al.: Learning to Forecast Pedestrian Intention from Pose Dynamics. Proc. of the 2018 IEEE Intelligent Vehicles Symposium (IV), Changshu, China, June 2018, pp. 1277-1284. DOI: 10.1109/IVS.2018.8500657.

As such, it is desirable to present an improved and robust solution for recognizing intentions. In addition, other desirable features and characteristics will become apparent from the subsequent summary and detailed description, and the appended claims, taken in conjunction with the accompanying drawings and this background.

SUMMARY

One aspect of the disclosure includes conducting an evaluation of the movement profiles of a pedestrian on the basis of selectively selected camera images of an image sequence, which provides an earlier and more reliable recognition of the action which the pedestrian will execute.

A first method for recognizing the intention of a pedestrian to move on the basis of a sequence of camera images includes the steps:

a) detecting a pedestrian in at least one camera image with an object detector;

b1) selecting a camera image that is current at the time t and selecting a predefined selection pattern of previous camera images of the image sequence, wherein the number of the selected camera images is smaller than the total number of the provided camera images of the sequence in the period of time spanning the time of the earliest selected camera image until the current camera image;

b2) extracting the image region in which the pedestrian was detected in the selected camera images of the image sequence;

c) classifying the movement profile of the detected pedestrian on the basis of the plurality or sequence of extracted image regions by means of a classifier; and d) outputting the class that describes the movement intention determined from the camera images of the image sequence.

An object detector or pedestrian detector serves to recognize objects or pedestrians in camera images. Such detectors are in principle known.

The camera images may be acquired with a camera fixed in or to the vehicle. This may be implemented with a camera arranged in the interior of the motor vehicle behind the windshield and directed in the direction of travel. The camera can be a monocular camera, a stereo camera, another image-acquiring 3D camera, or an individual camera of a multiple-camera system, such as a panoramic view camera system.

The camera may include an optical module, e.g., a camera lens having one or more lenses, and an image sensor, such as a semiconductor-based image acquisition sensor, by way of example a CMOS sensor.

A second method for recognizing the intention of a pedestrian to move on the basis of a sequence of camera images includes the steps:

a) detecting a pedestrian in at least one camera image with an object detector;

b1) selecting a camera image that is current at the time t and selecting a predefined selection pattern of previous camera images of the image sequence, wherein the number of the selected camera images is smaller than the total number of the provided camera images of the sequence in the period of time spanning the time of the earliest selected camera image until the current camera image;

b3) representing the pose of the detected pedestrian for the selected camera images of the image sequence by means of a pedestrian model;

c1) classifying the movement profile of the detected pedestrian on the basis of the plurality or sequence of pedestrian representations by means of a classifier; and d) outputting the class that describes the movement intention determined from the camera images of the image sequence.

The first and the second methods described above achieve classification of the course of movement of a pedestrian detected in a sequence of images.

The selection pattern may be predefined in such a way that the selected images cover a predefined time interval of t_s seconds, e.g., three seconds. One example would be selecting the images before 3 s, 2 s, 1 s and the last three images (n−2, n−1 and n). In other words, the earliest selected camera image $F\_j_{min}$ and the current camera image F_n define this time interval t_s.

The selection pattern may be predefined as a function of the previously classified movement pattern. After each previously recognized pedestrian pose, a defined number p of camera images of the sequence is skipped before a further camera image is evaluated regarding the next pedestrian pose.

The selection pattern may advantageously be predefined as a function of the image acquisition rate. It is assumed that a desired image acquisition rate corresponds to 10 fps (frames per second). If the actual image acquisition rate is doubled to 20 fps, only every other image of the image sequence is selected.

The selection pattern n−1, n−2, n−$2^m$ with a nonnegative integer m≥2 may be utilized. The selected images are then, e.g., (if m=3) those having the indices n, n−1, n−2, n−4 and n−8.

In an exemplary embodiment of the second method described above, a skeleton-like model of the pedestrian is determined in step b), which serves as a representation of the pose of the pedestrian.

According to a particular configuration of the first or of the second method described, the classifier provides at least the classes "walking", "standing", "setting off" (transition from standing to walking) and "stopping" (transition from walking to standing) in step c).

In addition to the information from the current camera images, the information from the previous camera images (or image details or pedestrian representations) within a predefined time interval of the image sequence are advantageously considered in step c). This can be affected by a selection pattern which predefines which previous camera images are to be considered, in order to consider a predefined time interval.

The number j of the previous images ($F_{j,\ j<n}$) which are considered may be a nonnegative integer greater than or equal to four.

The subject-matter of the disclosure also includes a driver assistance system for a vehicle, including a processing unit which is configured to recognize an intention of a pedestrian to move according to a method as described herein implemented in the processing unit and to utilize the recognized intention for a driver assistance function.

The driver assistance system can in particular be embodied by a corresponding control device. The processing unit can be a microcontroller or microprocessor, a digital signal processor (DSP), an ASIC (application-specific integrated circuit), a FPGA (field-programmable gate array) and such like as well as software for performing the corresponding method steps.

The methods described herein can consequently be implemented in digital electronic circuits, computer hardware, firmware or software.

Moreover, the disclosure relates to a vehicle having a vehicle camera for acquiring a camera image sequence of the surroundings of the vehicle and a driver assistance system.

A further subject-matter of the disclosure relates to a program element which, if a processing unit of a driver assistance system is programmed therewith, instructs the processing unit to perform a method according to the disclosure for recognizing the intention of a pedestrian to move.

Finally, the disclosure relates to a computer-readable medium, on which such a program element is stored.

An alternative third method for recognizing the intention of a pedestrian to move on the basis of a sequence of camera images includes the steps:

a) detecting a pedestrian in at least one camera image with an object detector;

b) extracting the image region in which the pedestrian was detected in multiple camera images of the image sequence;

c) classifying the movement profile of the detected pedestrian on the basis of the plurality or sequence of extracted image regions by utilizing a classifier; and d) outputting the class that describes the movement intention determined from the camera images of the image sequence.

The extracted image regions from the current camera image and from a predefined selection of previous camera images of the image sequence can be supplied to the classifier at a time t in step c).

An alternative fourth method for recognizing the intention of a pedestrian to move on the basis of a sequence of camera images includes the steps:

a) detecting a pedestrian in at least one camera image with an object detector;

b) representing the pose of the detected pedestrian utilizing a pedestrian model;

c) classifying the movement profile of the detected pedestrian on the basis of the plurality or sequence of pedestrian representations by utilizing a classifier; and d) outputting the class that describes the movement intention determined from the camera images of the image sequence.

BRIEF DESCRIPTION OF THE DRAWINGS

Exemplary embodiments and figures are described in greater detail below, wherein.

DETAILED DESCRIPTION

Figure 1:
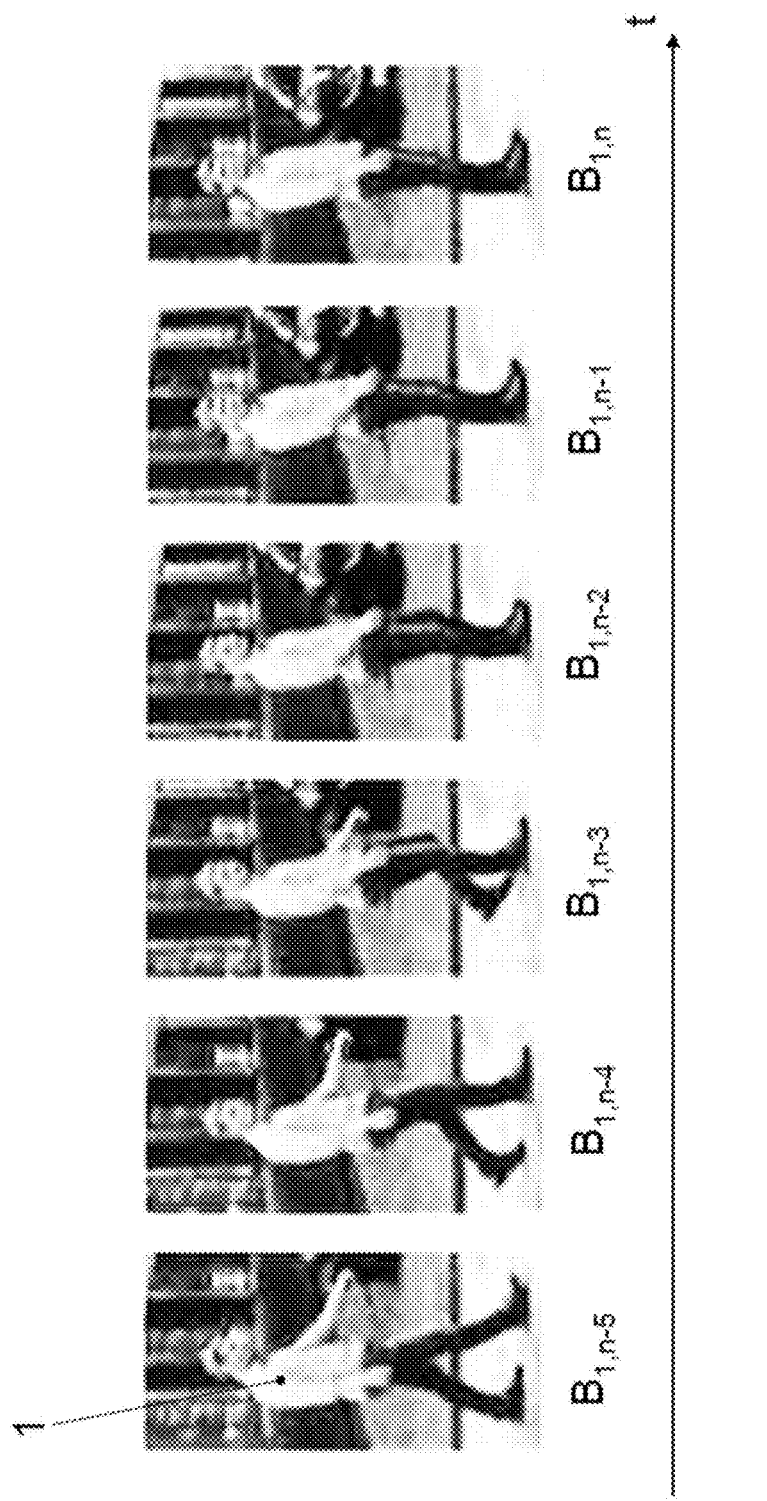
FIG. 1 shows a first sequence of image details having a pedestrian according to one exemplary embodiment.

In FIG. 1, a first sequence of image details $B_{1,n-5}, \ldots, B_{1,n}$ is depicted. The time axis t runs to the right. The image details contain a pedestrian 1. The image details were generated from an image sequence which was acquired with a vehicle camera. A pedestrian detector has detected a pedestrian 1 in at least one image of the image sequence. The image detail can be specified on the basis of this image and can be chosen to be so large that the pedestrian is completely contained in the image detail and movements of the pedestrian are also still contained in following image details in following images of the image sequence. It is additionally possible to establish the position of the image detail in each image of the image sequence anew, based on the output of the pedestrian detector. Alternatively, or cumulatively, the pedestrian 1, once detected, can be tracked (i.e., his movement can be monitored), in order to specify the position of the image detail, in each case, in the individual images of the image sequence.

On the basis of the sequence of image details $B_{1,n-5}, \ldots, B_{1,n}$ depicted in FIG. 1, it can be seen that the pedestrian is initially walking ($B_{1,n-5}$ to approx. $B_{1,n-3}$) and then stops (approx. $B_{1,n-2}$ to $B_{1,n}$).

A classification of "stop walking" or "stopping" is associated with this movement pattern.

Figure 2:
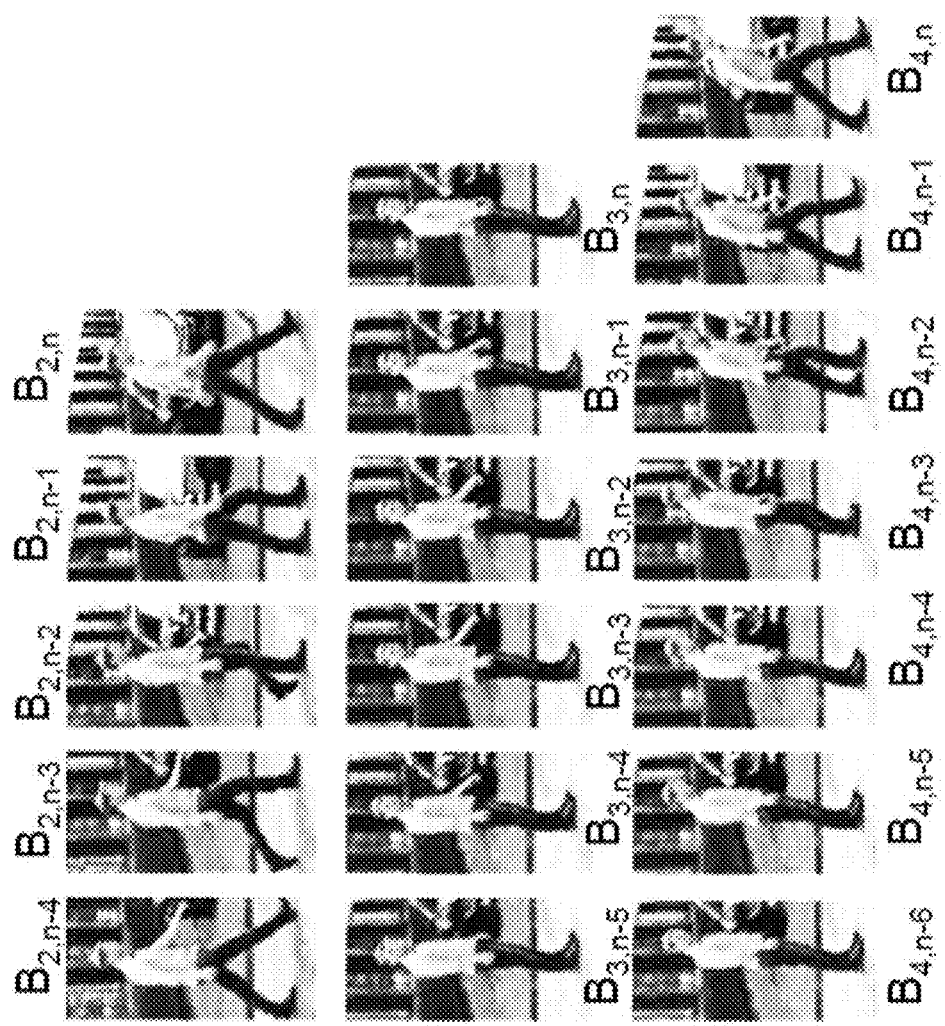
FIG. 2 shows three further sequences of image details having a pedestrian according to one exemplary embodiment.

In FIG. 2, three further sequences of image details $B_2$, $B_3$ and $B_4$ are depicted. The top sequence of image details $B_{2,n-4}, \ldots, B_{2,n}$ shows a (continually) walking pedestrian, the middle sequence of image details $B_{3,n-5}, \ldots, B_{3,n}$ shows a stationary pedestrian, and the bottom sequence of image details $B_{4,n-6}, \ldots, B_{4,n}$ shows a pedestrian who is initially stationary ($B_{4,n-6}$ to approx. $B_{4,n-4}$) and then sets off (approx. $B_{4,n-3}$ to $B_{4,n}$).

Figure 3:
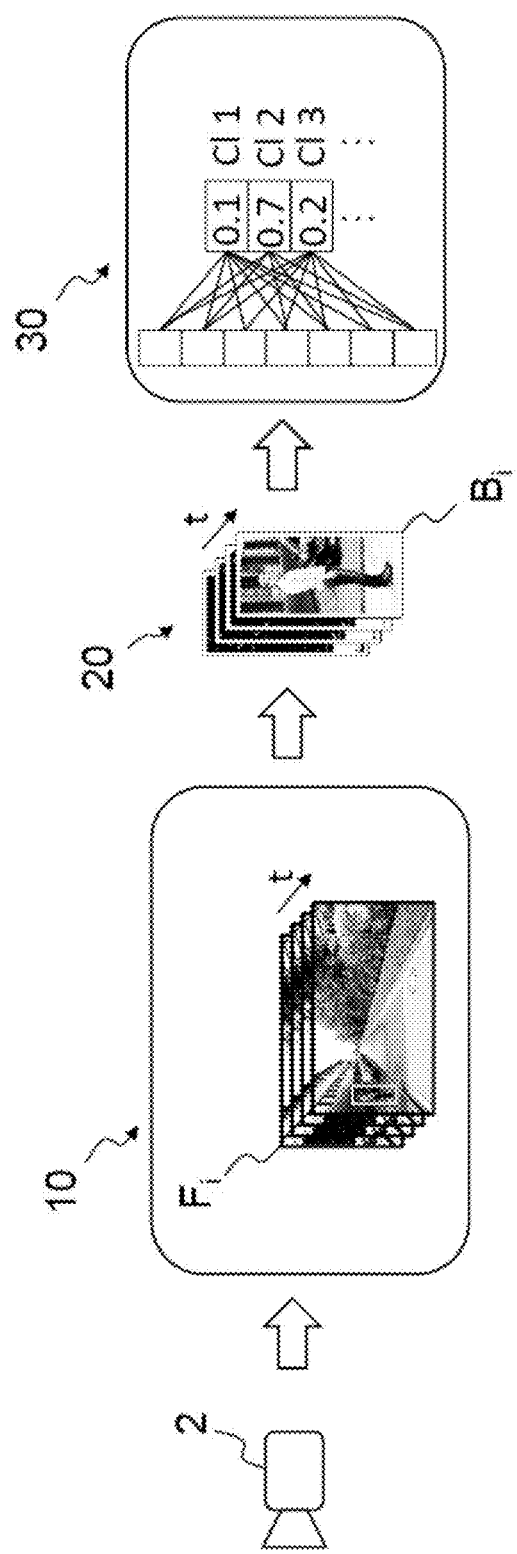
FIG. 3 shows a schematic illustration of a first method according to one exemplary embodiment.

FIG. 3 illustrates a first course of action in a schematic manner. A sequence of images $F_i$ of the surroundings of the vehicle is acquired with a camera 2 of a vehicle. The images $F_i$ are supplied to image processing having a pedestrian detector 10. The pedestrian detector 10 recognizes pedestrians 1 in the sequence of images $F_i$. Image regions $B_i$, on which the pedestrian is imaged, are extracted by an extraction module 20 from the image sequence and supplied to a classifier 30. The classifier 30 associates the sequence of image regions with learned classes (Cl 1, Cl 2, Cl 3, . . . ) of movement profiles. A probability (e.g., 10%, 70%, 20%) can be indicated for the individual classes (Cl 1, Cl 2, Cl 3, . . . ). In FIG. 3, the first class Cl 1 could correspond to "setting off", the second class Cl 2 to "standing" and the third class Cl 3 to "stopping". Further classes such as e.g., the class "walking", are not depicted.

The depicted result of the classifier would then mean that the probability that the detected pedestrian 1 is stationary is 70%, that he has stopped is 20% and that he is setting off is 10%. This classification result can now be transmitted to a driver assistance function, e.g., an emergency brake assistant. Alternatively, the classification result can be transmitted to a control system of an automatically driving vehicle. The downstream driving (driver assistance) systems can now consider whether the pedestrian wishes to cross the road and how probable this is at the current time.

Figure 4:
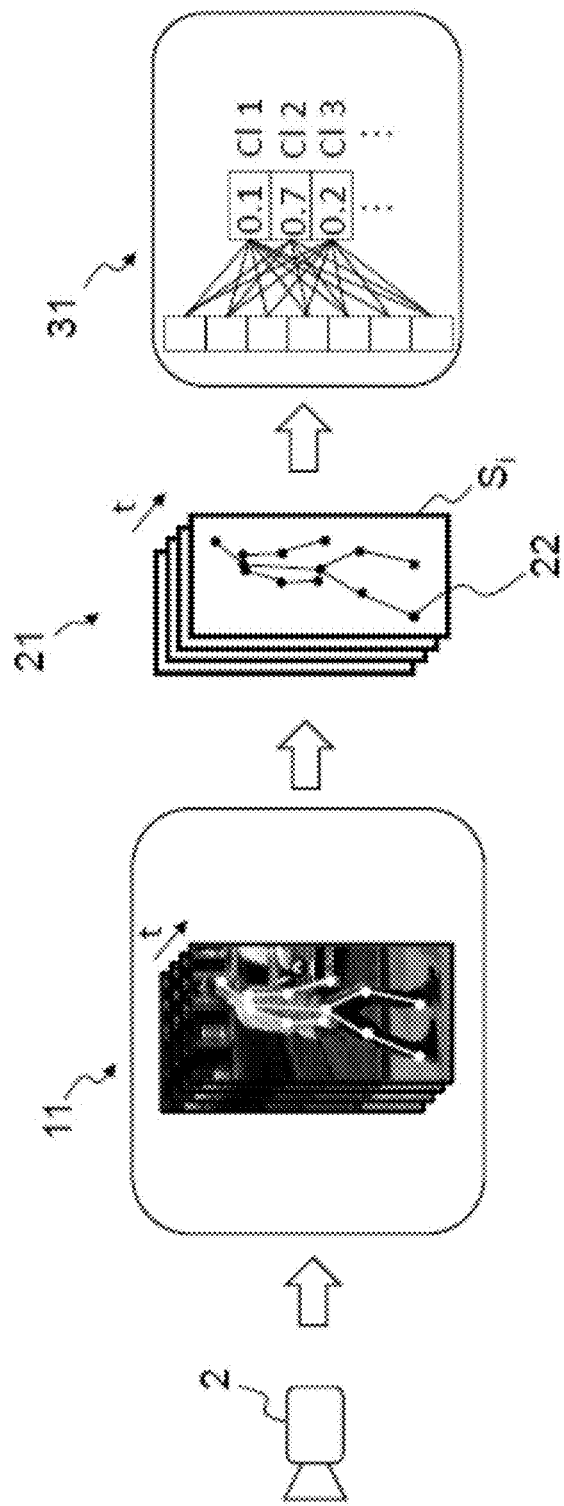
FIG. 4 shows a schematic illustration of a second method according to one exemplary embodiment.

FIG. 4 illustrates a second course of action in a schematic manner. The images acquired by the camera 2 are now supplied to a pose detector 11 which can be compared to the pedestrian detector 10 or an object detector. In addition to detecting a pedestrian 1, the pose detector 11 establishes a representation of the pose of the detected pedestrian 1 utilizing a pedestrian model. One possible way of doing this is determining key points 22 of the pedestrian. A key point 22 can in particular correspond to body parts or joints of the pedestrian 1. A skeleton model $S_i$ of the pedestrian 1 is created in a modeling module 21 for each image $F_i$ of the image sequence by an anatomically motivated connection of the related key points by means of straight lines. The sequence of skeleton models $S_i$ is now supplied to an (alternative) classifier 31 which is trained to associate movement profiles (Cl 1, Cl 2, Cl 3, . . . ) with this sequence of pose representations. If the classes were defined as in FIG. 3, 20% of the sequence of skeleton models $S_i$ depicted in FIG. 4 would be associated with the first class Cl 1 "setting off", 10% with the second class Cl 2 "standing" and 10% with the third class Cl 3 "stopping". The most probable class "walking" is not depicted, but could receive the remaining 60%.

Figure 5:
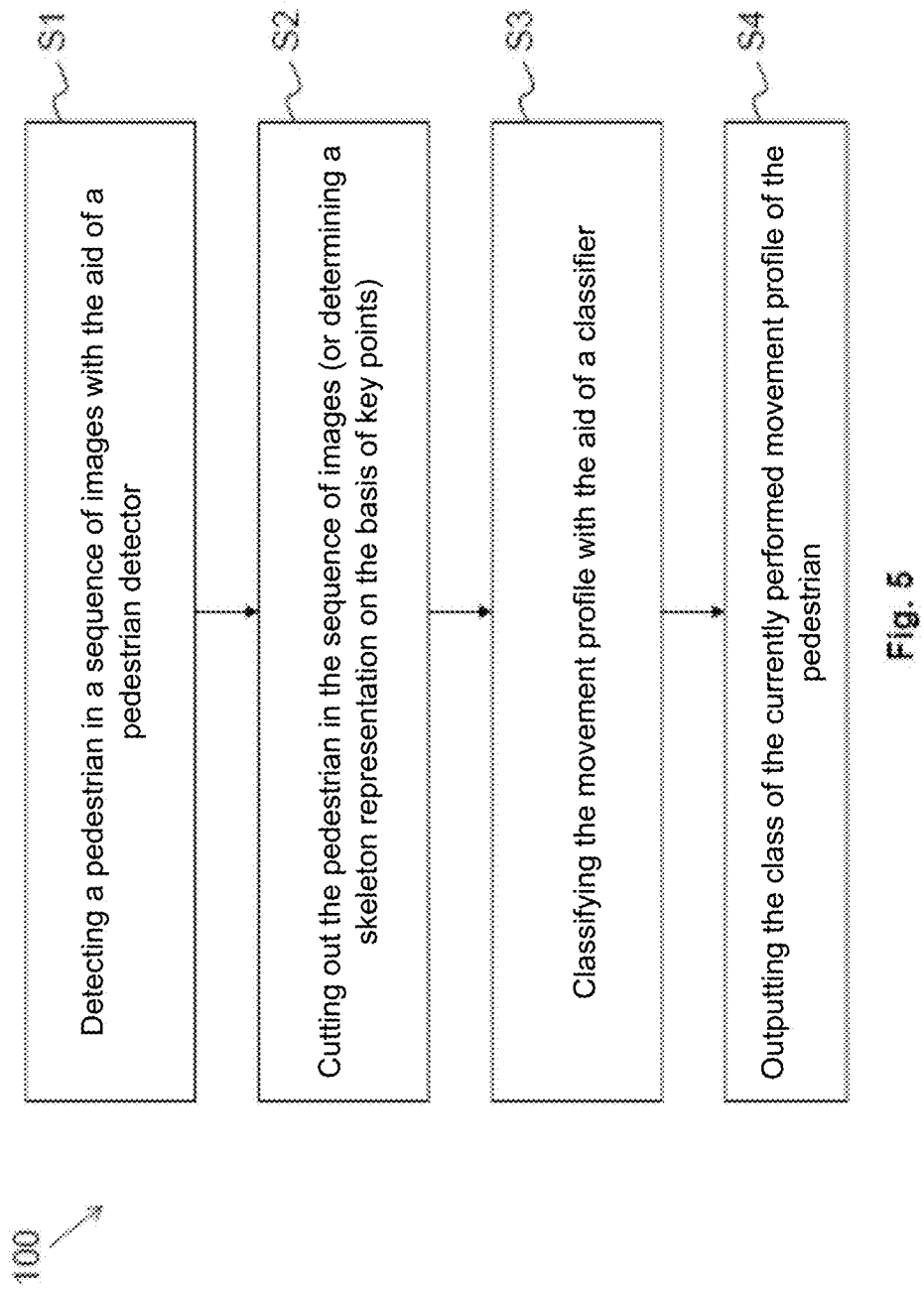
FIG. 5 shows a flow chart of a method according to one exemplary embodiment.

In FIG. 5, the course of a method 100 for recognizing which action the pedestrian is performing or intends to perform is depicted as a flowchart:

Step S1: detecting the pedestrian 1 in a sequence of images with the aid of a pedestrian detector.

Step S2: cutting out the pedestrian 1 in the sequence of images $F_i$ or alternatively, determining a skeleton representation $S_i$ on the basis of key points 22. Instead of, as already described, detecting the pedestrian 1 with a pedestrian detector and supplying the image data $B_i$ (pixel matrix) directly to the classifier 30, the pedestrian 1 is now detected and the latter's pose is represented by a skeleton model $S_i$. The pedestrian detector can determine key points 22 which correspond e.g. to connecting points between bones of the pedestrian skeleton. In order to classify the movement profile, the sequence of the image regions $B_i$ of the pedestrian 1 is now no longer used, but rather the parameters of the skeleton model $S_i$ for the image sequence $F_i$ directly.

Step S3: classifying the movement profile with the aid of a classifier 30 or 31 (e.g., of a CNN, a convolutional neural network), which is presented at any time with the image (or skeleton model) of the cut-out pedestrian of the current time step (image n) and the past k-time steps (images n−1, n−2, . . . , n−k).

Step S4: the class of the action (of the movement profile) which the pedestrian 1 is currently performing (walking, setting off, stopping or standing) is output.

What is claimed is:

1. A method for recognizing the intention of a pedestrian to move on the basis of a sequence of images of a camera, comprising:
    detecting a pedestrian in at least one image of the sequence of the images utilizing an object detector;
    selecting an image n from the sequence of the images that is current at the time t and selecting a predefined selection pattern of previous images of the image sequence, wherein the number of the selected images is smaller than the total number of the provided images of the sequence of images in the period of time spanning the time of the earliest selected image until the current image, and wherein the selection pattern is n−1, n−2, n−$2^m$ with a nonnegative integer m≥2;
    extracting the image region in which the pedestrian is detected in the selected images of the image sequence;
    classifying the movement profile of the detected pedestrian on the basis of the plurality of extracted image regions utilizing a classifier; and
    outputting the class that describes the movement intention determined from the images of the sequence of images.

2. The method according to claim 1, wherein the selection pattern is predefined in such a way that a predefined time interval is covered by the selection.

3. The method according to claim 1, wherein the selection pattern is predefined as a function of the previously classified movement profile.

4. The method according to claim 1, wherein the selection pattern is predefined as a function of a desired image acquisition rate of 10 frames per second.

5. The method according to claim 1, wherein the classifier provides at least the classes "walking", "standing", "setting off", and "stopping".

6. The method according to claim 1, further comprising considering the information from previous images within a predefined time interval of the image sequence in addition to the information from the current images.

7. The method according to claim 6, wherein a number j of the previous images which are considered is a nonnegative integer greater than or equal to four.

8. A method for recognizing the intention of a pedestrian to move on the basis of a sequence of camera images comprising:
    detecting the pedestrian in at least one camera image with an object detector;
    selecting a camera image n that is current at the time t and selecting a predefined selection pattern of previous camera images of the image sequence, wherein the number of the selected camera images is smaller than the total number of the provided camera images of the sequence in the period of time spanning the time of the earliest selected camera image until the current camera image, and wherein the selection pattern is n−1, n−2, n−$2^m$ with a nonnegative integer m≥2;
    representing the pose of the detected pedestrian for the selected camera images of the image sequence using a pedestrian model;
    classifying the movement profile of the detected pedestrian on the basis of the plurality or sequence of pedestrian representations with a classifier; and
    outputting the class that describes the movement intention determined from the camera images of the image sequence.

9. The method according to any one of claim 8, further comprising determining a skeleton-like model of the pedestrian to serve as a representation of the pose of the pedestrian.

10. A driver assistance system for a vehicle, comprising a microprocessor which is configured to recognize an intention of a pedestrian to move, said microprocessor configured to:
    detect a pedestrian in at least one image of the sequence of the images utilizing an object detector;
    select an image n from the sequence of the images that is current at the time t and selecting a predefined selection pattern of previous images of the image sequence, wherein the number of the selected images is smaller than the total number of the provided images of the sequence of images in the period of time spanning the time of the earliest selected image until the current image, and wherein the selection pattern is n−1, n−2, n−$2^m$ with a nonnegative integer m≥2;
    extract the image region in which the pedestrian is detected in the selected images of the image sequence;
    classify the movement profile of the detected pedestrian on the basis of the plurality of extracted image regions utilizing a classifier; and
    output the class that describes the movement intention determined from the images of the sequence of images.

* * * * *